June 29, 1926.
G. A. SEIB
1,590,445
TYPEWRITING MACHINE
Filed June 28, 1923
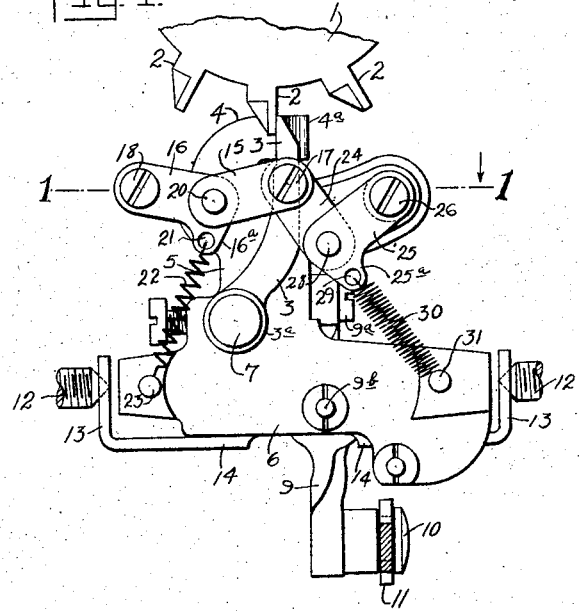
Fig. 1.
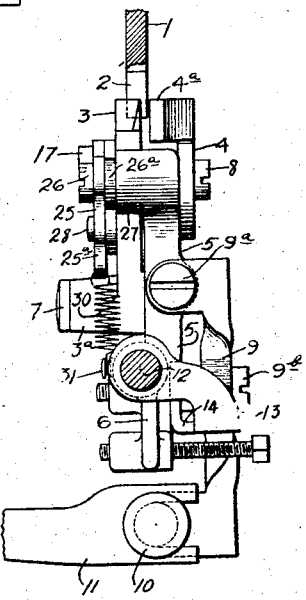
Fig. 2.
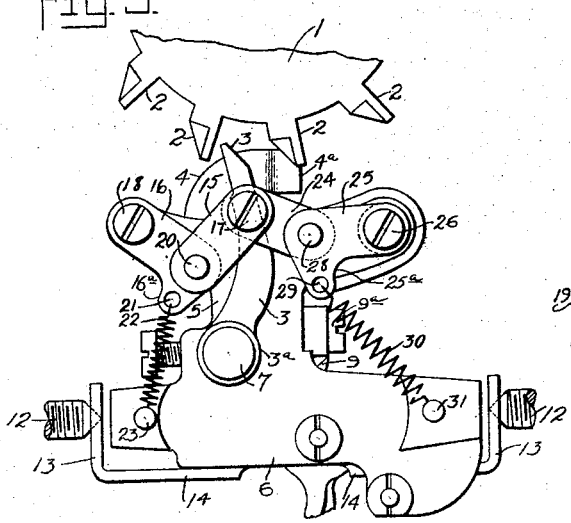
Fig. 3.
Fig. 4.
WITNESSES
C. M. Bugen
M. W. Pool
INVENTOR
George A. Seib
By Jacob Felbel
HIS ATTORNEY Patented June 29, 1926.

1,590,445

UNITED STATES PATENT OFFICE.

GEORGE A. SEIB, OF ILION, NEW YORK, ASSIGNOR TO REMINGTON TYPEWRITER COMPANY, OF ILION, NEW YORK, A CORPORATION OF NEW YORK.

TYPEWRITING MACHINE.

Application filed June 28, 1923. Serial No. 648,177.

My invention relates to escapement mechanism for typewriting machines and is chiefly concerned with stop devices for escapement dogs. The main object of the invention is to provide new and improved means for arresting the movable dog of an escapement mechanism preferably at both ends of its step or travel, noise incident to the arrest of the dog being practically eliminated.

To the above and other ends which will hereinafter appear, my invention consists in the features of construction, combinations of devices and arrangements of parts hereinafter described and particularly pointed out in the claims.

In the accompanying drawings,

Figure 1 is a fragmentary front elevation of an escapement mechanism embodying the preferred form of my invention.

Figure 2 is a side elevation of the same.

Figure 3 is a view corresponding to Figure 1 but showing some of the parts in different relationships.

Figure 4 is a horizontal sectional view taken on a plane indicated by the section line 1—1 in Figure 1 and looking downward in the direction of the arrow at said line.

All of the figures are drawn to an enlarged scale.

The escapement mechanism to which my invention is shown as applied is that of the #12 Remington typewriting machine, but it is of course to be understood that the invention is applicable to other styles of escapement mechanism, and I further wish it to be understood that parts of the invention may be used without other parts. The escapement devices comprise a toothed rack member or escapement wheel 1 provided with radial teeth 2 and which is operatively connected with the carriage in the usual way. Co-operative with the escapement wheel are two escapement dogs 3 and 4 mounted on and projecting upward from the top of a dog carrier or rocker comprising an upright portion 5 and a transverse lower portion 6, the part 5 terminating at the top in a cross head. The dog 3 has at its lower end a hub 3ª which receives a pivot screw 7 secured in the front side of the dog carrier, said dog at its upper end normally engaging with the lowermost tooth 2 of the escapement wheel. The dog 4 is adjustably secured at the rear side of the upright portion 3 of the carrier by screws 8 passing through slots 8ª in the dog and threaded into the carrier. Said dog 4 is provided with a beveled contact surface 4ª which co-operates with the escapement wheel when the carrier is rocked forward at printing operation. The rocking or vibratory movement of the carrier is effected by connections with a type bar operated universal bar, (not shown) said connections comprising a downward extension or arm 9 secured at its upper end by a screw 9ª to the side of the dog carrier and provided about midway of its length with a headed adjusting screw 9ᵇ which is threaded into the rear face of the dog carrier. A spring (not shown) is coiled around the shank of the screw 9ᵇ and is confined between the face of the dog carrier and the opposite face of the arm 9, said screw assisting in adjusting operations. The arm 9 carries a lateral pin 10 grooved to co-operate with the slotted rear end of a push link or connector 11 which is one of the elements in a train of connecting devices between the dog carrier and the universal bar. Oppositely disposed coned stationary pivots 12 engage in holes in the end portions 13 of a spring yoke-piece 14 which is suitably secured to the cross portion 6 of the dog carrier and serves to support the dog carrier from its pivots 12 as fully set forth and explained in my pending application, Sr. No. 567,564 filed June 12, 1922.

The movable or stepping dog 3 which is normally engaged with the escapement wheel has heretofore been usually maintained in its normal position by a stop device on the dog carrier separate from the dog 3 but against which it rests and is arrested. By my present invention I dispense with such separate stop, replacing it with a set or pair of toggle elements or links 15 and 16 which act as a stop for the dog, arresting it quickly and without shock or jar. The link 15 is pivoted at its right-hand end on a shouldered screw 17 which is threaded into the stepping dog 3 near its upper end, while the link 16 is pivoted or anchored at its outer end on the shouldered screw 18 which is threaded into a projection or lug 19 on the cross head of upright portion 5 of the dog carrier. The two links 15 and 16 are pivotally connected together or jointed by a double headed pin 20 which permits free movement between the links. The link 16 is provided with a slight extension or angularly disposed enlargement 16ª which is formed with a hole indicated at 21 through which is hooked the upper end of a coiled dog spring 22. The spring 22 extends downward and is anchored at its lower end to a pin 23, said spring acting on the toggle joint 20 and constantly tending to break the toggle 15, 16, and swing or step the dog 3 leftward. Normally the links 15 and 16 are drawn into a substantially straight line as shown in Figure 1 by the force of the carriage motor or main spring acting through the engaged tooth 2 of the escapement wheel on the upper end of the stepping dog 3. This tends to swing the stepping dog toward the right in Fig. 1 and to straighten the toggle comprising the links 15 and 16 against the resistance offered by the spring 22. Said spring 22 of course is much weaker than the carriage main spring, so that the stepping dog will finally be arrested in its normal position by the substantial straightening of the links 15 and 16, the pull or pressure exerted by the escapement wheel eventually reacting against the pivot 18 of the link 16.

The second pair or set of links or toggle elements 24 and 25 are employed to limit the stepping movement of the dog 3 when it is released from the escapment wheel and pulled to the left by its spring 22. The left-hand end of the link 24 is pivotally connected to the dog 3 at 17, the shoulder screw 17 serving as a common pivot for both of the links 15 and 24, the latter being loosely confined between the links 15 and the front face of the dog 3. The link 25 is anchored to the dog carrier or rocker, being pivoted on a shoulder screw 26 which is threaded into a projection or boss 27 on the right-hand end portion of the cross head of the dog carrier. A spacing washer 26ª fitting loosely on the screw 26 is interposed between the link 25 and the face of the boss 27. The adjacent end portions of the links 24 and 25 are pivotally connected together by a double headed pin 28 which is sufficiently loose to permit free relative rotary movements between the two links 24 and 25. The link 25 has a short extension or enlargement 25ª which is formed with a hole indicated at 29 to which is connected the upper end of a coiled spring 30, the lower end of said spring being hooked over or anchored to a pin 31 on the cross portion 6 of the dog carrier. The spring 30 is considerably weaker than the spring 22 and acts to break the toggle 24, 25, said spring 30 tending constantly to draw downward the connected ends of the links 24 and 25. The final position of these two links when the toggle is broken is illustrated in Fig. 1, which shows the links substantially at right angles, the pull of the spring 30 being lengthwise of the link 24. At this time it will be observed that the other toggle device comprising the links 15 and 16 is substantially straight, and it will further be understood that the two sets or pairs of toggle devices or links are adapted to be alternately straightened and broken; that is, when one of the toggles is straight, the other is broken, and vice versa. This will best be understood perhaps by a reference to Fig. 3 and a comparison of it with Fig. 1. Fig. 3 shows the positions of the parts at the end of the independent stepping movement of the dog 3. When one of the printing keys is actuated, the associate type bar will act to thrust the link or connector 11 rearward, rocking the dog carrier or rocker on its axial center passing through the pivots 12, and causing the dog 3 to swing forward transversely out of the plane of the escapement wheel 1 and the dog 4 to swing into engagement therewith, the contact surface 4ª of said dog engaging with the tooth 2 just released by the stepping dog 3. When the dog 3 is released from the escapement wheel the spring 22 acting through the toggle 15, 16 becomes effective to break said toggle and swing said dog leftward on its pivot 7, at the same time overcoming the weaker spring 30 and straightening the toggle 24, 25. The stepping movement of the dog 3 under the impulse of the spring 22 transmitted through the links 15 and 16 will be terminated by the substantial straightening of the links 24 and 25 as illustrated in Fig. 3, the pull of the spring 22 reacting through the links 24 and 25 and finally against the stationary pivot or anchor 26 of the link 25.

It will be understood that following the printing operation, as the dog carrier swings back towards normal position on its pivots 12, the dog 4 will be swung out of the escapement wheel and the dog 3 will reenter the plane of the wheel being engaged by the oncoming tooth 2 immediately following the tooth with which said dog had previously engaged. Said oncoming tooth 2 will pick up the dog 3 and swing it back towards the right on its pivot 7 to normal position, overcoming the spring 22 and breaking the toggle 24, 25, the spring 30 initiating and assisting in this last named operation. As the dog 3 is swung back towards the right by the escapement wheel, the toggle 15, 16 will gradually be straightened, and the dog 3 will be arrested when the toggle 15, 16 is substantially straight, thus arresting the escapement wheel and eventually the carriage, which, by the outlined operations has been permitted to advance through a letter space distance.

It will be seen that the stepping movements of the dog 3, or its independent movements in both directions on its pivot 7, are limited and controlled in both directions by sets of toggle devices or links which are constantly connected with the dog and which therefore effect its arrest at both ends of its stepping or traveling movements with an avoidance of the noise which results when, as usually heretofore, stops disconnected from the dog have been employed. In practice I have found that the use of my present invention reduces the noise incident to the arrest of the stepping dog to a minimum and that the satisfactory operation of the escapement is not interfered with by the employment of the novel toggle stop devices.

Various changes may be made without departing from my invention.

What I claim as new and desire to secure by Letters Patent is:—

1. In escapement mechanism for typewriting machines, the combination of a dog carrier, a dog pivoted thereon, and sets of toggle members connected to said pivoted dog and operative to limit pivotal movements of said dog in both directions, and thereby controlling the normal position of said dog and the extent of its stepping movement from such normal position 2. In escapement mechanism for typewriting machines, the combination of a dog carrier, a dog pivoted thereon, sets of toggle members operative to limit pivotal movements of said dog in both directions, one member of each set being pivotally connected directly to said dog and the other member of each set of toggles being anchored to the dog carrier, the toggle members of one set being normally substantially straight, the other toggle being normally broken.

3. In escapement mechanism for typewriting machines, the combination of a dog carrier, a dog pivoted thereon, pairs of toggle stops for said dog, both pairs being anchored to said dog carrier and having also a common pivotal connection to said dog and means tending constantly to break both pairs of said toggle stops.

4. In escapement mechanism for typewriting machines, the combination of a dog carrier, a dog pivoted thereon, pairs of toggle links effective to limit pivotal movements of said dog in both directions, and spring means constantly acting on the joints of said pairs of links and tending to break the toggles.

5. In escapement mechanism for typewriting machines, the combination of a dog carrier, a dog pivoted thereon, pairs of toggle links effective to limit pivotal movements of said dog in both directions, two coiled springs, one connected to one of the links of each pair, said springs tending constantly to break their respective toggles, one of said springs being stronger than the other.

6. In escapement mechanism for typewriting machines, the combination of a toothed rack member, a dog rocker, a holding dog on said rocker, a stepping dog pivotally supported on said rocker and normally engaged with said rack member, a pair of toggle links connected directly to said stepping dog and to said dog rocker, said links being normally substantially straight and limiting the movement of said stepping dog under the action of said rack member.

7. In escapement mechanism for typewriting machines, the combination of a toothed rack member, a dog rocker, a holding dog on said rocker, a stepping dog pivotally supported on said rocker and normally engaged with said rack member, a pair of toggle links connected directly to said stepping dog and to said dog rocker, said links being normally substantially straight and limiting the movement of said stepping dog under the action of said rack member, and a spring anchored to said dog member and connected to one of said links, said spring tending constantly to break the toggle joint.

8. In escapement mechanism for typewriting machines, the combination of a toothed rack member, a dog rocker, a holding dog on said rocker, a stepping dog pivotally supported on said rocker and normally engaged with said rack member, a pair of toggle links normally substantially straight and limiting the movement of said stepping dog under the action of said rack member, and a second pair of toggle links effective on said stepping dog to limit its movement in the opposite direction, one member of each pair of links being connected directly to said stepping dog.

9. In escapement mechanism for typewriting machines, the combination of a toothed rack member, a dog rocker, a holding dog on said rocker, a stepping dog pivotally supported on said rocker and normally engaged with said rack member, a pair of toggle links normally substantially straight and limiting the movement of said stepping dog under the action of said rack member, a spring constantly tending to break the toggle, a second pair of toggle links for limiting movement of said dog under the action of said spring when released from said rack member, and a second spring weaker than the first and constantly tending to break the second toggle.

10. In escapement mechanism for typewriting machines, the combination of a rack member having relatively fixed teeth, a dog rocker adapted to rock during escapement operations, a holding dog, a stepping dog, a dog spring for stepping said dog so as to afford escapement movements of said mechanism, and connections between said spring and said stepping dog comprising a pair of links pivotally connected together and extending oppositely from their point of pivotal connection.

11. In escapement mechanism for typewriting machines, the combination of a rack member having relatively fixed teeth, a dog rocker adapted to rock during escapement operation, a holding dog, a stepping dog, a dog spring for stepping said dog so as to afford escapement movements of said mechanism, and means for arresting said stepping dog at the end of its return movement under the impulse of said rack member, said means comprising two parts positively connected together and extending oppositely from their point of connection, one of said parts being carried by said dog rocker and the other by said stepping dog, said means itself providing the connection between said spring and said stepping dog.

Signed at Ilion, in the county of Herkimer, and State of New York, this 26th day of June, A. D. 1923.

GEORGE A. SEIB.